US012802071B2

(12) United States Patent
Mahzoon et al.

(10) Patent No.: US 12,802,071 B2
(45) Date of Patent: Nov. 17, 2026

(54) SYSTEMS AND METHODS FOR ASSESSING FRAUD RISK USING MACHINE LEARNING

(71) Applicant: Walmart Apollo, LLC, Bentonville, AR (US)

(72) Inventors: Mohammad Javad Mahzoon, Fremont, CA (US); Gnanapriya Venkatasubramaniam, San Carlos, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 57 days.

(21) Appl. No.: 18/428,096

(22) Filed: Jan. 31, 2024

(65) Prior Publication Data

US 2025/0245666 A1 Jul. 31, 2025

(51) Int. Cl.
*G06Q 20/40* (2012.01)
*G06Q 20/38* (2012.01)

(52) U.S. Cl.
CPC ....... *G06Q 20/4016* (2013.01); *G06Q 20/382* (2013.01)

(58) Field of Classification Search
None
See application file for complete search history.

(56) References Cited

U.S. PATENT DOCUMENTS 10,460,320 B1 * 10/2019 Cao ........................ G06N 20/10
12,141,806 B2 * 11/2024 Butvinik ................ G06N 20/00
2017/0140382 A1 * 5/2017 Chari .................. G06Q 20/389
2019/0295088 A1 * 9/2019 Jia ............................ G06N 5/04
2019/0378049 A1 * 12/2019 Widmann ............ G06N 3/0464
2021/0004682 A1 1/2021 Gong et al.
2021/0004809 A1 * 1/2021 Goyal .................... G06N 20/00
2022/0180367 A1 6/2022 Zhu et al.
2022/0207409 A1 6/2022 Kelton et al.
2022/0245641 A1 * 8/2022 Wintle .................. G06F 18/214
2023/0334497 A1 * 10/2023 Ur ....................... G06Q 30/0185
2024/0232892 A1 * 7/2024 Kulasekaran ...... G06Q 20/4016
2025/0014040 A1 * 1/2025 Smith ................ G06Q 20/4016
2025/0131436 A1 * 4/2025 Xiang .................. G06Q 30/018
2025/0156872 A1 * 5/2025 Bahirwani ............... G06N 5/01
2025/0165978 A1 * 5/2025 Howard ................. G06N 20/00

FOREIGN PATENT DOCUMENTS

CN 113344562 A 9/2021
GB 2632150 A * 1/2025 ......... G06Q 20/4016

* cited by examiner

*Primary Examiner* — Christopher Bridges
(74) *Attorney, Agent, or Firm* — Morgan, Lewis & Bockius LLP; Manita Rawat

(57) ABSTRACT

Systems and methods for assessing fraud risk based on sequence transaction data using machine learning are disclosed. In some embodiments, a disclosed method includes: receiving, from a computing device, a risk assessment request regarding a user device; generating sequence data based on a time series of transactions associated with the user device; computing, using at least one machine learning model, risk score data of the user device based on the sequence data; and transmitting, in response to the risk assessment request, the risk score data of the user device to the computing device.

20 Claims, 15 Drawing Sheets

500

700

800

990

| | Coeff 1 | Coeff 2 | Coeff 3 | Trend |
|---|---|---|---|---|
| Seq #1 | $C_{11}$ | $C_{12}$ | $C_{13}$ | Positive |
| Seq #2 | $C_{21}$ | $C_{22}$ | $C_{23}$ | Negative |
| Seq #3 | $C_{31}$ | $C_{32}$ | $C_{33}$ | Neutral |
| ... | ... | ... | ... | ... |
| Seq #n | $C_{n1}$ | $C_{n2}$ | $C_{n3}$ | Negative |

1200

1300

SYSTEMS AND METHODS FOR ASSESSING FRAUD RISK USING MACHINE LEARNING

TECHNICAL FIELD

This application relates generally to machine learning processes and, more particularly, to systems and methods for assessing fraud risk based on sequence transaction data using machine learning.

BACKGROUND

Some transactions, such as some in-store or online retail transactions, are fraudulent. In one example, a fraudster may attempt to purchase an item using a payment form, such as a credit card, belonging to another person without permission. In another example, if a fraudster gains access to another customer's computer or mobile device, the fraudster may be able to purchase items on a retailer website using the customer's payment forms. Thus, online purchase conveniences may facilitate fraudulent online retail transactions. In each of these examples, the fraudster is involved in a fraudulent transaction or activity, which may cause time and financial losses of the victimized person and may also cause financial harm to the retailer. Thus, customers and retailers can benefit from the identification of fraudulent transactions before they happen.

Traditional fraud detection models use hand-crafted features. Manually creating and maintaining such features is time consuming. In addition, these manually created features are very specific and rigid, which makes it difficult to experiment and analyze these features for different time windows. Furthermore, interpretation and modelling of these hand-crafted features are heavily impacted by thinking biases of data scientists.

SUMMARY

The embodiments described herein are directed to systems and methods for assessing fraud risk based on sequence transaction data using machine learning.

In various embodiments, a system including a non-transitory memory configured to store instructions thereon and at least one processor is disclosed. The at least one processor is operatively coupled to the non-transitory memory and configured to read the instructions to: receive, from a computing device, a risk assessment request regarding a user device; generate sequence data based on a time series of transactions associated with the user device; compute, using at least one machine learning model, risk score data of the user device based on the sequence data; and transmit, in response to the risk assessment request, the risk score data of the user device to the computing device.

In various embodiments, a computer-implemented method is disclosed. The computer-implemented method includes: receiving, from a computing device, a risk assessment request regarding a user device; generating sequence data based on a time series of transactions associated with the user device; computing, using at least one machine learning model, risk score data of the user device based on the sequence data; and transmitting, in response to the risk assessment request, the risk score data of the user device to the computing device.

In various embodiments, a non-transitory computer readable medium having instructions stored thereon is disclosed. The instructions, when executed by at least one processor, cause at least one device to perform operations including: receiving, from a computing device, a risk assessment request regarding a user device; generating sequence data based on a time series of transactions associated with the user device; computing, using at least one machine learning model, risk score data of the user device based on the sequence data; and transmitting, in response to the risk assessment request, the risk score data of the user device to the computing device.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
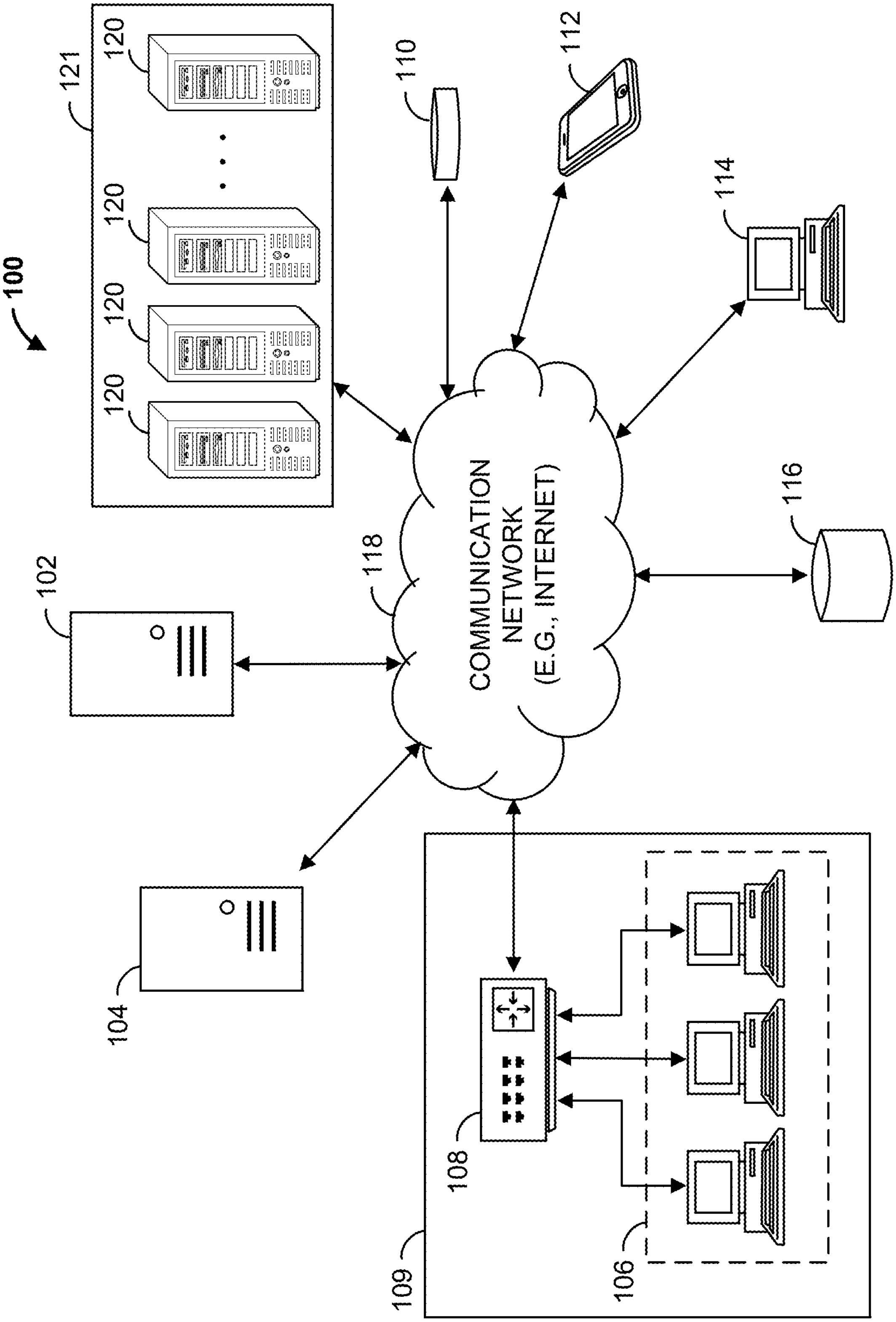
FIG. 1 is a network environment configured for assessing fraud risk using machine learning, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Understanding customer behavior over time can provide invaluable information for detecting fraudulent transactions. Fraudulent transactions (e.g., account taken over or stolen financials) usually stand out as an anomaly when they are put in context around previous non-fraud customer transactions. For example, an account taken over (ATO) could happen when an account diverges from its regular shopping pattern; and a stolen financial (SF) could happen when a financial instrument is used along with a set of new entities compared to previous transactions. In some examples, high velocity usage could signify ATO, SF or transaction abuse.

One objective of the present teaching is to predict the likelihood of a fraudulent transaction or the risk of fraud, by creating and analyzing temporal features based on data sequence analytics. In some embodiments, sequence analytics utilize (1) a data model which tracks data in a sequence form, and (2) an analytic model which operates on sequence data to detect fraudulent patterns. The disclosed method is generic and modular which allows experimenting with different machine learning algorithms and producing the best results for the business. In some examples, a device-based sequence analytics can track fuel transactions originating from a mobile device, e.g., through a payment application on the mobile device. The analytics model may use a recurrent neural network (RNN) or transformer model to detect fraudulent transactions, considering the context of previous transactions.

In some embodiments, a disclosed system uses sequence data storing raw features, without handcrafting or biases in features. The temporal features can be captured and analyzed with the sequence data model. In addition, sequence analytics may capture only the useful temporal patterns, and understand transaction context. In some embodiments, the disclosed system inputs the sequence data into a trained machine learning model to compute risk scores representing a fraud risk of a transaction and/or a user device.

There are various use cases for the risk scores. The risk scores can be used directly or as features for fraud detection of online or in-store shopping. The risk scores can be used to send notifications asking customers for verification of card, device, or password, as proactive actions for fraud prevention. In addition, the risk scores can help learning good customer behaviors, which enables rewarding the good or non-fraud customers with promotions, early-access, etc. Furthermore, the risk scores can help computing store risk ratings, which can prevent fraud at a store using gamification approaches.

Furthermore, in the following, various embodiments are described with respect to systems and methods for assessing fraud risk based on sequence transaction data using machine learning are disclosed. In some embodiments, a disclosed method includes: receiving, from a computing device, a risk assessment request regarding a user device; generating sequence data based on a time series of transactions associated with the user device; computing, using at least one machine learning model, risk score data of the user device based on the sequence data; and transmitting, in response to the risk assessment request, the risk score data of the user device to the computing device.

Turning to the drawings, FIG. 1 is a network environment 100 configured for assessing fraud risk using machine learning, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a fraud risk computing device 102, a server 104 (e.g., a web server or an application server), a cloud-based engine 121 including one or more processing devices 120, a database 116, and one or more user computing devices 110, 112, 114 operatively coupled over the network 118. The fraud risk computing device 102, the server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the fraud risk computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the fraud risk computing device 102.

In some examples, each of the multiple user computing devices 110, 112, 114 can be a cellular phone, a smart phone, a tablet, a personal assistant device, a voice assistant device, a digital assistant, a laptop, a computer, a laser-based code scanner, or any other suitable device. In some examples, the server 104 hosts one or more retail websites. In some examples, the fraud risk computing device 102, the processing devices 120, and/or the server 104 are operated by a retailer, and the multiple user computing devices 110, 112, 114 are operated by customers and/or advertisers associated with the retailer websites. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109 of a retailer, for example. The workstation(s) 106 can communicate with the fraud risk computing device 102 over the communication network 118. The workstation(s) 106 may send data to, and receive data from, the fraud risk computing device 102. For example, the workstation(s) 106 may transmit data identifying items purchased by a customer at the store 109 to the fraud risk computing device 102.

Although FIG. 1 illustrates three user computing devices 110, 112, 114, the network environment 100 can include any number of user computing devices 110, 112, 114. Similarly, the network environment 100 can include any number of the fraud risk computing devices 102, the processing devices 120, the servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first user computing device 110, the second user computing device 112, and the Nth user computing device 114 may communicate with the server 104 over the communication network 118. For example, each of the multiple user computing devices 110, 112, 114 may be operable to view, access, and interact with a website, such as a retailer's website, hosted by the server 104. The server 104 may capture user session data related to a customer's activity (e.g., interactions) on the website.

In some examples, a customer may operate one of the user computing devices 110, 112, 114 to initiate a web browser that is directed to the website hosted by the server 104. In another example, a customer may operate and use a mobile app or application, API or a utility operating in a computer or in a mobile device or another form of digital or smart device or system, which allows customer to perform retail transaction or an e-commerce activity such as online shopping. The customer may, via the web browser, view item advertisements for items displayed on the website, and may click on item advertisements, for example. The website may capture these activities as user session data, and transmit the user session data to the fraud risk computing device 102 over the communication network 118. The website may also allow the operator to add one or more of the items to an online shopping cart, and allow the customer to perform a "checkout" of the shopping cart to purchase the items. In some examples, the server 104 transmits purchase data identifying items the customer has purchased from the website to the fraud risk computing device 102.

In some examples, a customer may go to a store, e.g., the store 109 for purchasing items. The customer may use some payment method, e.g., a credit card or a payment app, at the store 109 to purchase one or more items. The workstation(s) 106 in the store 109 may capture these activities as in-store purchase data and transmit the in-store purchase data to the fraud risk computing device 102 over the communication network 118.

In some examples, the fraud risk computing device 102 may receive a risk assessment request regarding a user device or a payment method from either the server 104 or the store 109. The risk assessment request may be sent standalone or together with transaction related data associated with the user device. In some examples, the risk assessment request may carry or indicate transaction related data of the user device in a past time period. In response, the fraud risk computing device 102 generates risk score data for the user device. The risk score data may include a time series of risk scores and/or a trend status for the user device.

In some examples, the fraud risk computing device 102 may execute one or more models (e.g., programs or algorithms), such as a machine learning model, deep learning model, statistical model, etc., to generate risk score data for a user device. The fraud risk computing device 102 may generate and transmit the risk score data of the user device to the server 104 or the store 109 over the communication network 118, and the server 104 or the store 109 may determine whether to proceed on a transaction with the user device, or whether to run some fraud check or other use cases with the user device.

In some embodiments, the fraud risk computing device 102 is further operable to communicate with the database 116 over the communication network 118. For example, the fraud risk computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the fraud risk computing device 102, in some examples, the database 116 can be a local storage device, such as a hard drive, a non-volatile memory, or a USB stick. The fraud risk computing device 102 may store online purchase data received from the server 104 in the database 116. The fraud risk computing device 102 may receive in-store purchase data from different stores 109 and store them in the database 116. The fraud risk computing device 102 may also receive from the server 104 user session data identifying events associated with browsing sessions, and may store the user session data in the database 116. The fraud risk computing device 102 may also compute risk score data in response to a risk assessment request received from the server 104 or the store 109, and may store the risk score data in the database 116.

In some examples, the fraud risk computing device 102 generates and/or updates different models for assessing fraud risk. The models, when executed by the fraud risk computing device 102, allow the fraud risk computing device 102 to compute a time series of risk scores each corresponding to a respective transaction in a time series of transactions, and generate risk score data based on the time series of risk scores.

In some examples, the fraud risk computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the fraud risk computing device 102 may generate risk score data.

Figure 2:
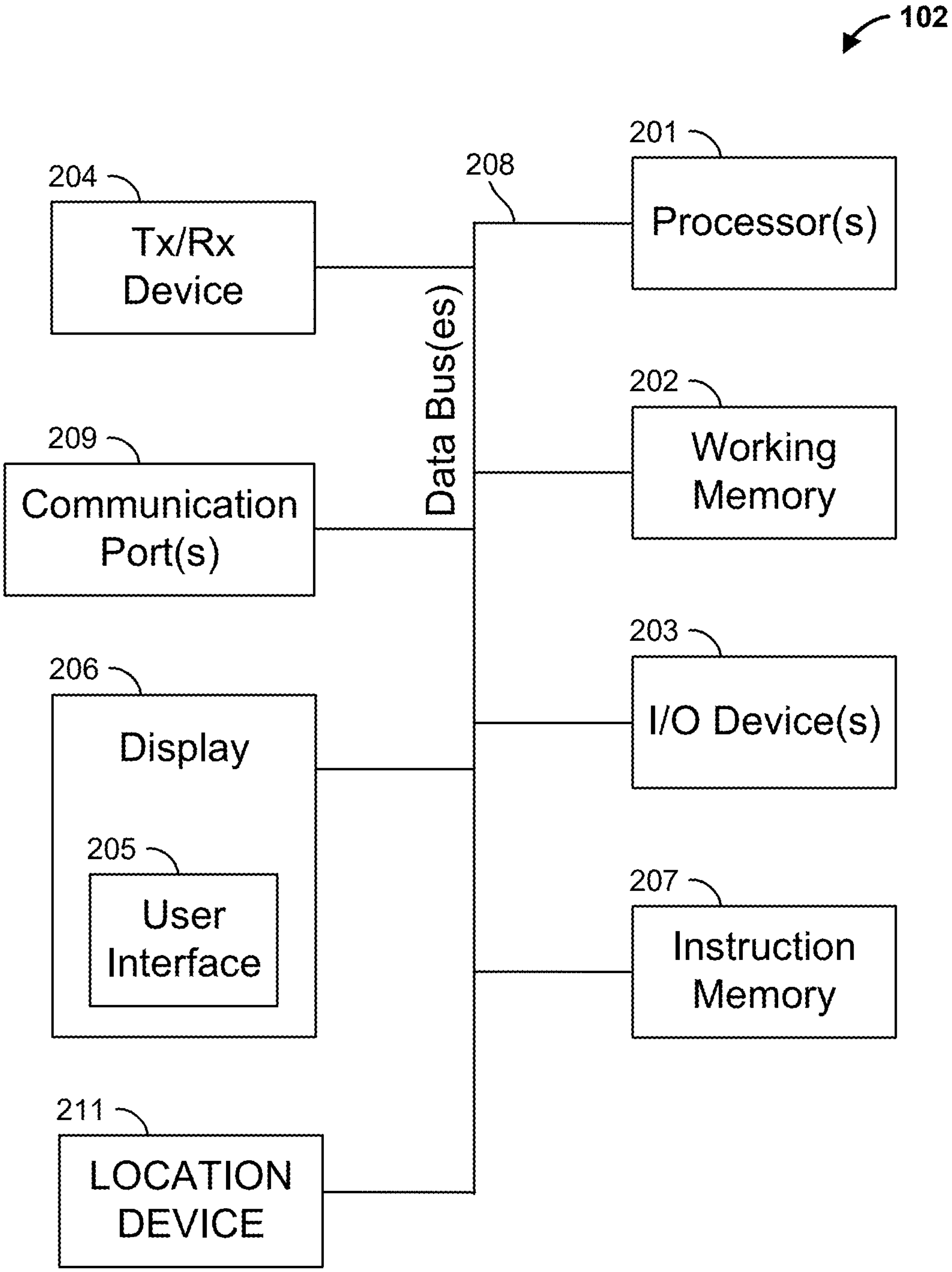
FIG. 2 is a block diagram of a fraud risk computing device, in accordance with some embodiments of the present teaching.

FIG. 2 illustrates a block diagram of a fraud risk computing device, e.g., the fraud risk computing device 102 of FIG. 1, in accordance with some embodiments of the present teaching. In some embodiments, each of the fraud risk computing device 102, the server 104, the multiple user computing devices 110, 112, 114, and the one or more processing devices 120 in FIG. 1 may include the features shown in FIG. 2. Although FIG. 2 is described with respect to certain components shown therein, it will be appreciated that the elements of the fraud risk computing device 102 can be combined, omitted, and/or replicated. In addition, it will be appreciated that additional elements other than those illustrated in FIG. 2 can be added to the fraud risk computing device 102.

As shown in FIG. 2, the fraud risk computing device 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 allow for communication among the various components. The data buses 208 can include wired, or wireless, communication channels.

The one or more processors 201 can include any processing circuitry operable to control operations of the fraud risk computing device 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the fraud risk computing device 102 can include a single memory unit configured to operate as both instruction memory and working memory. Further, although embodiments are discussed herein including non-volatile memory, it will be appreciated that the fraud risk computing device 102 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the fraud risk computing device 102 will be operating in. The one or more processors 201 are operable to receive data from, or send data to, a network, such as the communication network 118 of FIG. 1, via the transceiver 204.

The communication port(s) 209 may include any suitable hardware, software, and/or combination of hardware and software that is capable of coupling the fraud risk computing device 102 to one or more networks and/or additional devices. The communication port(s) 209 can be arranged to operate with any suitable technique for controlling information signals using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the fraud risk computing device 102 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the fraud risk computing device 102 and/or the server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the fraud risk computing device 102 may determine a local geographical area (e.g., town, city, state, etc.) of its position.

In some embodiments, the fraud risk computing device 102 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multi-threading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
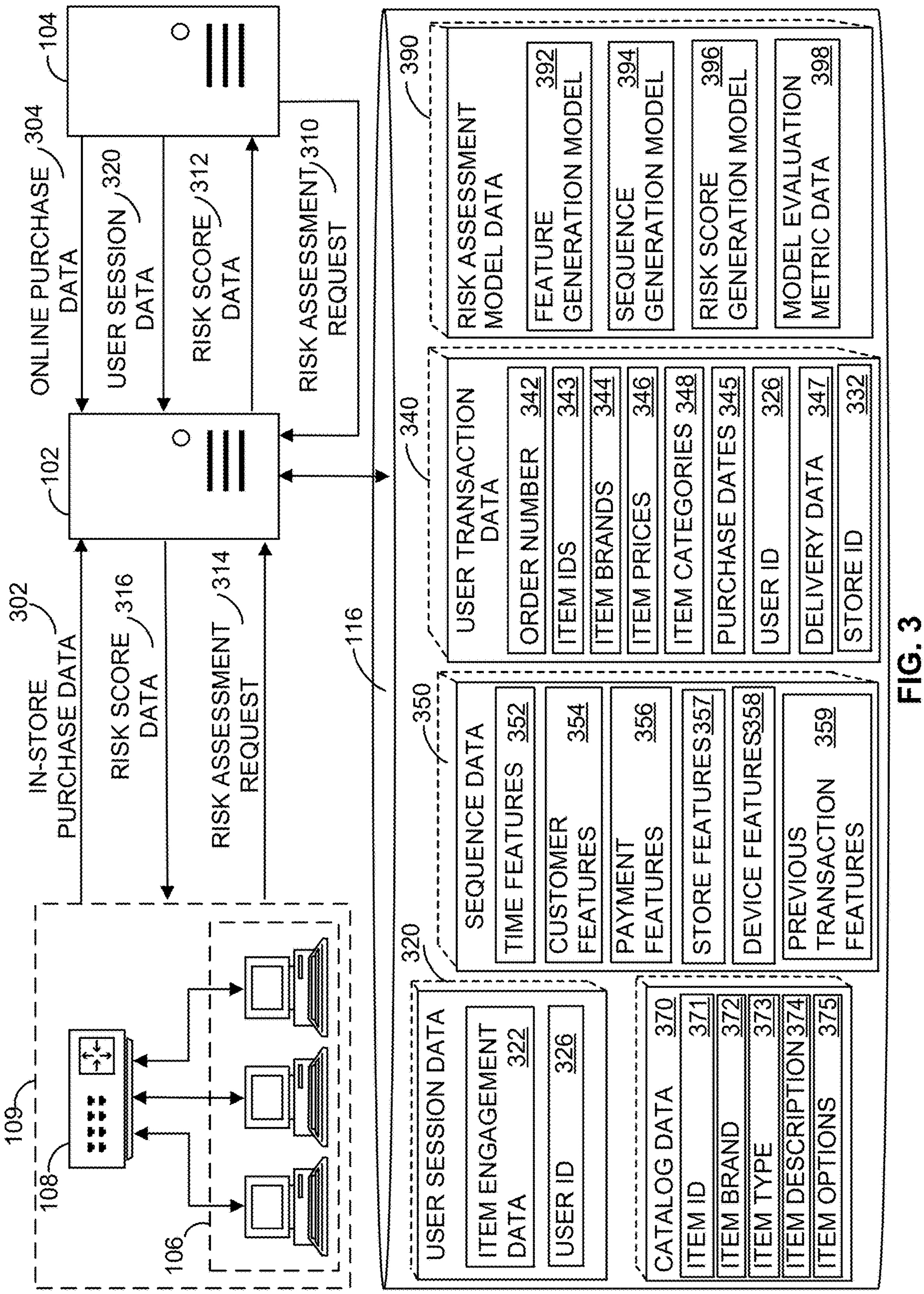
FIG. 3 is a block diagram illustrating various portions of a system for assessing fraud risk using machine learning, in accordance with some embodiments of the present teaching.

FIG. 3 is a block diagram illustrating various portions of a system for assessing fraud risk using machine learning, e.g. the system shown in the network environment 100 of FIG. 1, in accordance with some embodiments of the present teaching. As indicated in FIG. 3, the fraud risk computing device 102 may receive user session data 320 from the server 104, and store the user session data 320 in the database 116. The user session data 320 may identify, for each user (e.g., customer), data related to that user's browsing session, such as when browsing a retailer's webpage hosted by the server 104.

In some examples, the user session data 320 may include item engagement data 322, and user ID 326 (e.g., a customer ID, retailer website login ID, a cookie ID, etc.). The item engagement data 322 may include one or more of a session ID (i.e., a website browsing session identifier), items added-to-cart identifying items added to the user's online shopping cart. The fraud risk computing device 102 may also receive online purchase or transaction data 304 from the server 104, which identifies and characterizes one or more online purchases, such as purchases made by the user and other users via a retailer's website hosted by the server 104. The fraud risk computing device 102 may also receive in-store purchase or transaction data 302 from the store 109, which identifies and characterizes one or more in-store purchases, transactions, or customer activities. In some embodiments, the in-store purchase data 302 may also indicate other information about the store 109.

The fraud risk computing device 102 may parse the in-store purchase data 302 and the online purchase data 304 to generate user transaction data 340. In this example, the user transaction data 340 may include, for each purchase, one or more of: an order number 342 identifying a purchase order, item IDs 343 identifying one or more items purchased in the purchase order, item brands 344 identifying a brand for each item purchased, item prices 346 identifying the price of each item purchased, item categories 348 identifying a product type (or category) of each item purchased, purchase dates 345 identifying the purchase dates of the purchase orders, a user ID 326 for the user making the corresponding purchase, delivery data 347 indicating delivery information for corresponding online orders, and store ID 332 for the corresponding in-store purchase, or for the pickup store or shipping-from store associated with the corresponding online purchase.

In some embodiments, the database 116 may further store sequence data 350, which may identify sequence data related to a time series of transactions associated with a user device of any customer of the stores 109 or e-commerce platforms (shopping website and/or shopping app) hosted by the server 104. The sequence data 350 may include, for each user device, time features data 352, customer features data 354, payment features data 356, store features data 357, device features data 358, and previous transaction features data 359. In some examples, the time features data 352 identifies time features related to transactions, e.g. hours since last transaction, hours of current transaction, happening time (noon, day, or midnight) of the current transaction. In some examples, the customer features data 354 identifies features related to customers, e.g. retailer membership status of a customer using the user device, associate status of the customer, time on file for the customer. In some examples, the payment features data 356 identifies features related to payment, e.g. payment identity, time on file for a payment method, a distance between billing address and store address. In some examples, the store features data 357 identifies features related to a store, e.g. a store region covering the store where the current transaction is located, a fraud ranking of the store region compared to other store regions. In some examples, the device features data 358 identifies features related to a device, e.g. time on file for the device with a current retailer, time on files for the device with other entities, unique user accounts associated with the device, unique payment methods attached to the device. In some examples, the previous transaction features data 359 identifies features related to previous transactions on the same user device, e.g. purchase amount and product type of the previous one or more transactions.

In some embodiments, the database 116 may further store catalog data 370, which may identify one or more attributes of a plurality of items, such as a portion of or all items a retailer carries in stores and/or at e-commerce platforms. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store risk assessment model data 390 identifying and characterizing one or more models and related data for assessing fraud risk. For example, the risk assessment model data 390 may include a feature generation model 392, a sequence generation model 394, a risk score generation model 396, and model evaluation metric data 398.

The feature generation model 392 may be used to generate features related to user devices and transactions. These features may be used for risk assessment of a user device based on a fraud risk score model or training the fraud risk score model. In some embodiments, the feature generation model 392 is used to generate various features in the sequence data 350.

The sequence generation model 394 may be used to generate sequence data based on the features generated by the feature generation model 392. The sequence data may include one or more data sequences each corresponding to a time series of transactions, for computing risk score data during an inference stage of the system or training a fraud risk score model during a training stage of the system. For example, the sequence data may include a device sequence comprising a sequence of data points each including transaction related features of a respective transaction in a time series of transactions performed on a user device within a time period. In some embodiments, the sequence generation model 394 includes rules for applying an input window on a device data sequence to generate a plurality of data sequences each based on a respective subset of the corresponding time series of transactions. The plurality of data sequences may be used together with some labels for training a fraud risk score model. In some examples, a label may be generated to indicate a last transaction in the corresponding time series of transactions as: a fraudulent transaction or a non-fraudulent transaction.

The risk score generation model 396 may be used to generate risk score data comprising a time series of risk scores for a user device. The risk score generation model 396 may be a machine learning model selected from a plurality of machine learning models that are trained based on features generated by the feature generation model 392, the sequence data generated by the sequence generation model 394, and/or labels attached to the sequence data. In some embodiments, each risk score in the time series of risk scores indicates a probability that a respective transaction performed on the user device is a fraudulent transaction. In some embodiments, the risk score data comprises a plurality of coefficients and a trend status of the user device. The plurality of coefficients form a polynomial curve fitting data points of the time series of risk scores. The trend status is determined based on the polynomial curve and indicates the user device as: positive trend, negative trend, neutral trend, or transitional trend from one to another of the above three trends.

The model evaluation metric data 398 may include metric data for evaluating a machine learning model, e.g. the feature generation model 392, the sequence generation model 394, the risk score generation model 396, or any machine learning model for computing a risk score. In some embodiments, the model evaluation metric data 398 includes an impact score, which is computed based on a difference between a sales value and a weighted chargeback value, for evaluating a corresponding machine learning model. The sales value is computed based on true negative fraud detections of the corresponding machine learning model. The weighted chargeback value is computed based on: (a) false negative fraud detections of the corresponding machine learning model and (b) weights determined based on a ratio between successful transactions and chargebacks within a past time period.

In some examples, the fraud risk computing device 102 receives a risk assessment request 310 from the server 104. The risk assessment request 310 may be associated with a user device of a customer of an e-commerce platform, e.g. a retailer's website or app, hosted by the server 104. In some examples, the risk assessment request 310 is to seek an assessment of fraud risk of the user device. The fraud risk computing device 102 may generate sequence data based on a time series of transactions (e.g. in-store and online transactions) associated with the user device. In some embodiments, the fraud risk computing device 102 may obtain the sequence data from the server 104 and/or the database 116. Based on the sequence data, the fraud risk computing device 102 may compute, using at least one machine learning model, risk score data 312 of the user device. The machine learning model(s) used by the fraud risk computing device 102 may include any model in the risk assessment model data 390. In response to the risk assessment request 310, the fraud risk computing device 102 transmits the risk score data 312 of the user device to the server 104.

In some examples, the fraud risk computing device 102 receives a risk assessment request 314 from the store 109. The risk assessment request 314 may be associated with a user device of a customer in the store 109 of a retailer. In some examples, the risk assessment request 314 is to seek an assessment of fraud risk of the user device used in the store 109. The fraud risk computing device 102 may generate sequence data based on a time series of transactions (e.g. both in-store and online transactions) associated with the user device. In some embodiments, the fraud risk computing device 102 may obtain the sequence data from the store 109, the server 104 and/or the database 116. Based on the sequence data, the fraud risk computing device 102 may compute, using at least one machine learning model, risk score data 316 of the user device. The machine learning model(s) used by the fraud risk computing device 102 may include any model in the risk assessment model data 390. In response to the risk assessment request 314, the fraud risk computing device 102 transmits the risk score data 316 of the user device to the store 109.

In some embodiments, the fraud risk computing device 102 may assign one or more of the above described operations to a different processing unit or virtual machine hosted by one or more processing devices 120.

Figure 4:
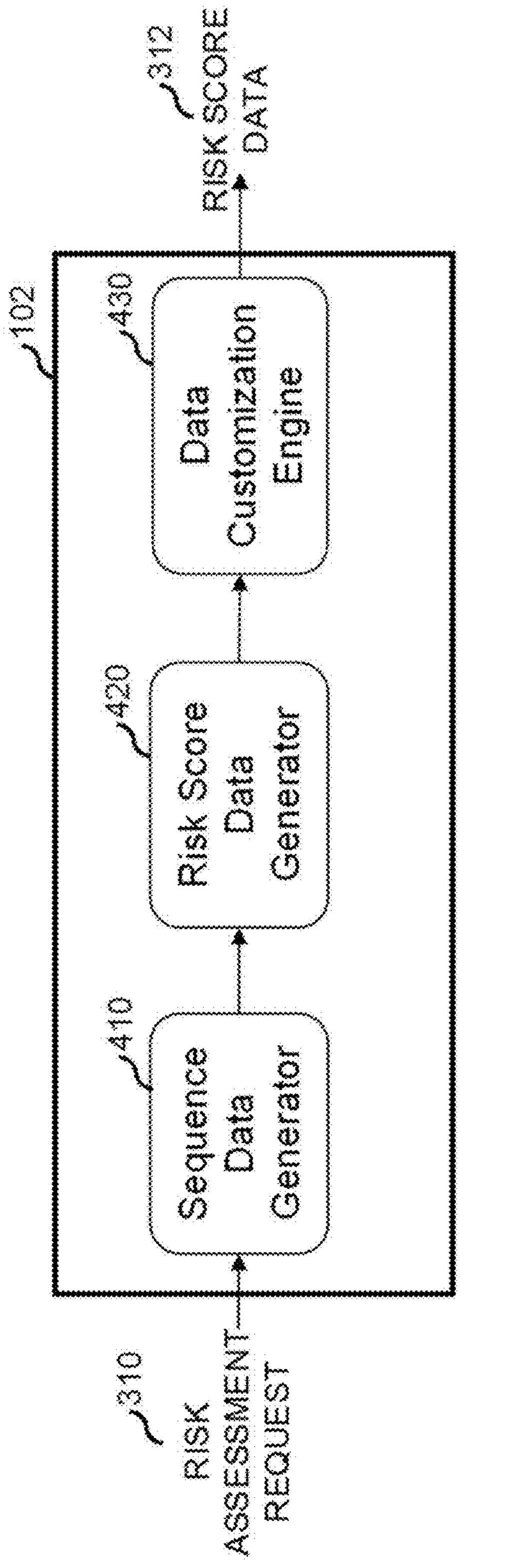
FIG. 4 illustrates a detailed diagram of a fraud risk computing device for computing risk score data, in accordance with some embodiments of the present teaching.

FIG. 4 illustrates a detailed diagram of a fraud risk computing device, e.g. the fraud risk computing device 102 in FIG. 1 and/or FIG. 3, for computing risk score data. In the example shown in FIG. 4, the fraud risk computing device 102 includes: a sequence data generator 410, a risk score data generator 420, and an optional data customization engine 430.

In some embodiments, the sequence data generator 410 receives a risk assessment request regarding a user device, which may be the risk assessment request 310 as shown in FIG. 4 or the risk assessment request 314 as shown in FIG. 3. The sequence data generator 410 can generate sequence data based on a time series of transactions associated with the user device according to the risk assessment request 310. For example, the sequence data may include a sequence of data points each corresponding to a respective transaction in the time series of transactions. In some examples, the sequence data generator 410 extracts the sequence data, e.g. from the database 116. The sequence data generator 410 sends the sequence data to the risk score data generator 420 for risk score generation.

In some embodiments, the risk score data generator 420 generates risk score data for the user device using a fraud risk score model based on the sequence data generated by the sequence data generator 410. In some examples, the risk score data generator 420 generates, using a fraud risk score model, a time series of risk scores each corresponding to a respective transaction in the time series of transactions performed on or associated with the user device. In some embodiments, the fraud risk score model is a machine learning model pre-trained based on transactions and interactions performed by a plurality of user devices within a past time period. In some embodiments, the risk score data is generated by the risk score data generator 420 in real-time after receiving the risk assessment request regarding the user device, while a customer is trying to perform a transaction via the user device, e.g. in-store or online.

In some embodiments, the risk score data generated by the risk score data generator 420 further comprises a plurality of coefficients and a trend status of the user device. The plurality of coefficients form a polynomial curve fitting data points of the time series of risk scores. The trend status is determined based on the polynomial curve and indicates the user device as: positive trend, negative trend, neutral trend, or transitional trend from one to another of the above three trends.

The data customization engine 430 in this example is an optional component for customizing data presentation. In some examples, the risk assessment request 310 seeks only the trend status of the user device. In some examples, the risk assessment request 310 seeks only the risk scores of the transactions on the user device. In some examples, the risk assessment request 310 seeks all of the trend status, the plurality of fitting coefficients, and the risk scores for the user device. In some examples, the risk assessment request 310 seeks a trend curve of the user device in a specific format or document type. The data customization engine 430 can meet all of these requirements accordingly to output the risk score data 312 (or the risk score data 316 as shown in FIG. 3) based on the data received from the risk score data generator 420.

Figure 9A:
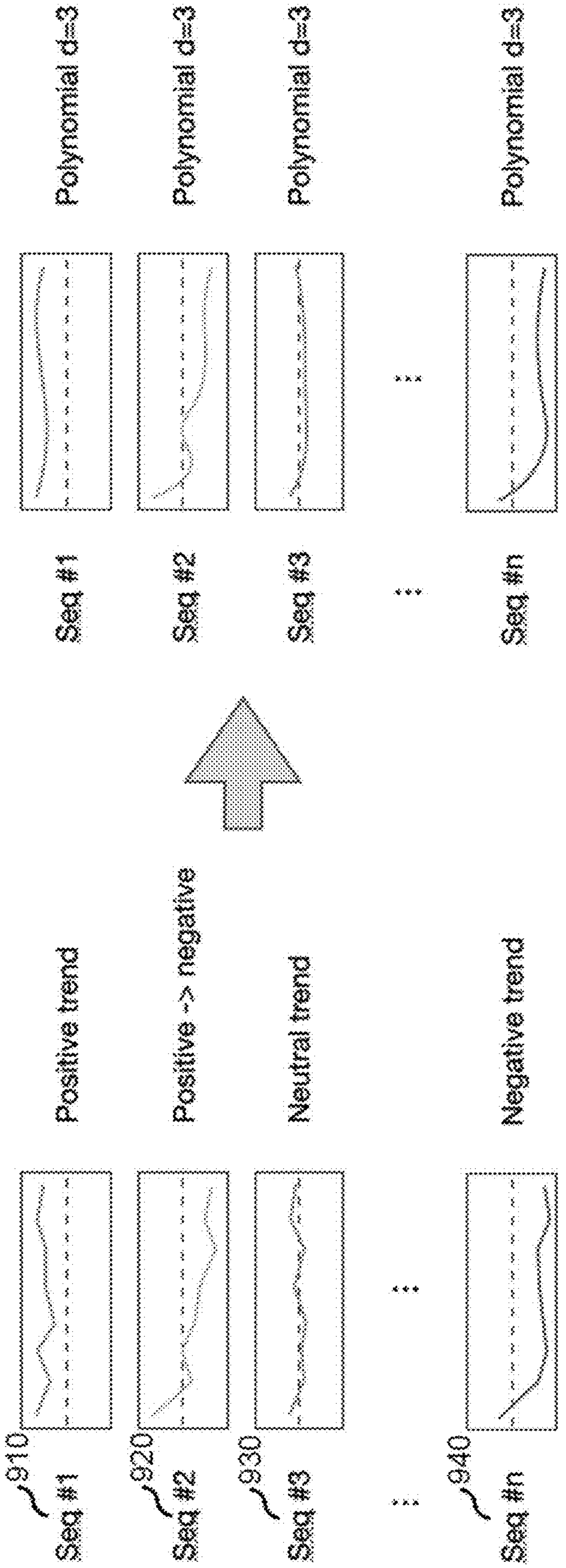
FIG. 9A and FIG. 9B illustrate a process for investigating and customizing risk score data, in accordance with some embodiments of the present teaching.
Figure 9B:
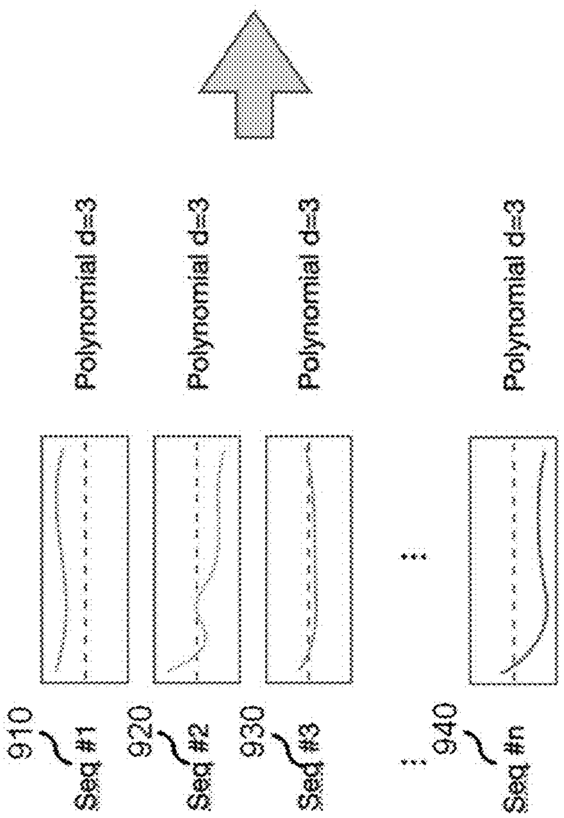

FIG. 9A and FIG. 9B illustrate a process for investigating and customizing risk score data, in accordance with some embodiments of the present teaching. In some embodiments, the process can be carried out by one or more computing devices, such as the server 104 and/or the fraud risk computing device 102 of FIG. 1. For example, the process in FIG. 9A and FIG. 9B can be performed by the data customization engine 430 in the fraud risk computing device 102.

In the example shown in FIG. 9A and FIG. 9B, there are n data sequences: Sequence #1 910, Sequence #2 920, Sequence #3 930 . . . . Sequence #n 940. In some examples, each of the n data sequences is a device sequence generated based on a time series of transactions performed by a corresponding user device. Each data point in a device sequence corresponds to transaction data of a corresponding transaction in the time series of transactions. All data points in a device sequence may form a trend for the corresponding user device. In the example shown in FIG. 9A and FIG. 9B, the Sequence #1 910 has a positive trend; the Sequence #2 920 has a transaction trend from positive to negative; the Sequence #3 930 has a neutral trend; and the Sequence #4 940 has a negative trend.

As shown in FIG. 9A, the system can perform a polynomial curve fitting based on the data points in each device sequence, to generate a polynomial curve representing the trend of each device sequence. While it may be difficult and unnecessary to store and send an entirety of each polynomial curve, the system can generate a plurality of coefficients to represent each polynomial curve. In the example shown in FIG. 9B, three coefficients are used to represent each polynomial curve for a corresponding user device. In some embodiments, the fraud risk computing device 102 can store the three coefficients and a corresponding trend status (positive, negative, neutral, etc.) for each user device, in the database 116. In some embodiments, the fraud risk computing device 102 may include the three coefficients and/or the corresponding trend status for each user device in the risk score data 312 or the risk score data 316.

Referring back to FIG. 4, the data customization engine 430 may generate a risk profile for each user device, based on the risk score data of the user device including the trend status of the user device. The risk profile may be adaptive to updated transactions of the user device. The data customization engine 430 can transmit the risk profile as a specified format together with or as part of the risk score data 312. In some embodiments, the data customization engine 430 may use a machine learning model to cluster or classify behaviors of the user devices, based on the dataset 990 in FIG. 9 including the three coefficients and the corresponding trend status for each user device. The clustering information may also be stored in the database 116 or sent to the fraud risk computing device 102 or the server 104 for fraud detection, fraud prevention, customer rewarding, etc.

Figure 5:
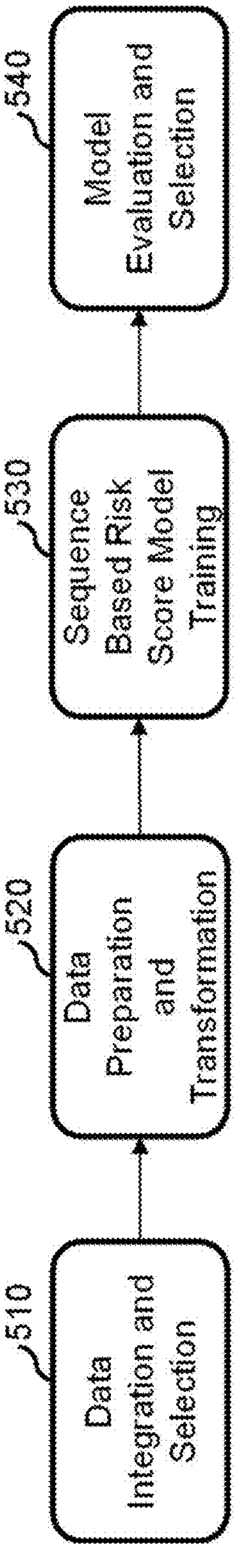
FIG. 5 illustrates a process for training a fraud risk score model, in accordance with some embodiments of the present teaching.

FIG. 5 illustrates a process 500 for training a fraud risk score model, e.g. the fraud risk score model utilized by the risk score data generator 420 in FIG. 4, in accordance with some embodiments of the present teaching. In some embodiments, the process 500 can be carried out by one or more computing devices, such as the server 104 and/or the fraud risk computing device 102 of FIG. 1. For example, the process 500 can be performed by the fraud risk computing device 102 periodically (e.g. daily, weekly, or monthly), or upon an event or request.

As shown in FIG. 5, the process 500 starts from operation 510, where data integration and selection are performed. In some embodiments, the data integration and selection include collecting and integrating transaction data related to transactions performed by a plurality of user devices within a past time period, e.g. from the stores 109, the server 104, and/or the database 116.

In some embodiments, the data integration and selection include selecting data from the integrated transaction data, e.g. based on stratification, to generate selected data. In some examples, the data is selected based on some specified conditions related to a split of training dataset and test dataset. For example, the specified conditions may include: how much fraud data to put in the test dataset, what is the percentage of acceptable fraud data amount in the training dataset, which data columns to ignore, which data columns are target columns to provide, how to stratify for the dataset splitting, etc.

At operation 520, data preparation and transformation are performed based on the selected data from the operation 510. In some embodiments, the data preparation and transformation include generating, for each respective user device of the plurality of user devices, a corresponding sequence data based on a corresponding time series of transactions associated with the respective user device. In some examples, the sequence data for different user devices are generated based on a resilient and persistent device ID for each user device.

In some embodiments, the data preparation and transformation include: processing the selected data based on encoding and imputation to generate processed data; generating a device data sequence including N data points for all of the corresponding time series of transactions, wherein each data point is associated with transaction data of a respective transaction in the corresponding time series of transactions, wherein N is an integer; applying an input window on the device data sequence to generate a plurality of data sequences each based on a respective subset of the corresponding time series of transactions; and generating the corresponding sequence data based on the plurality of data sequences.

Figure 6:
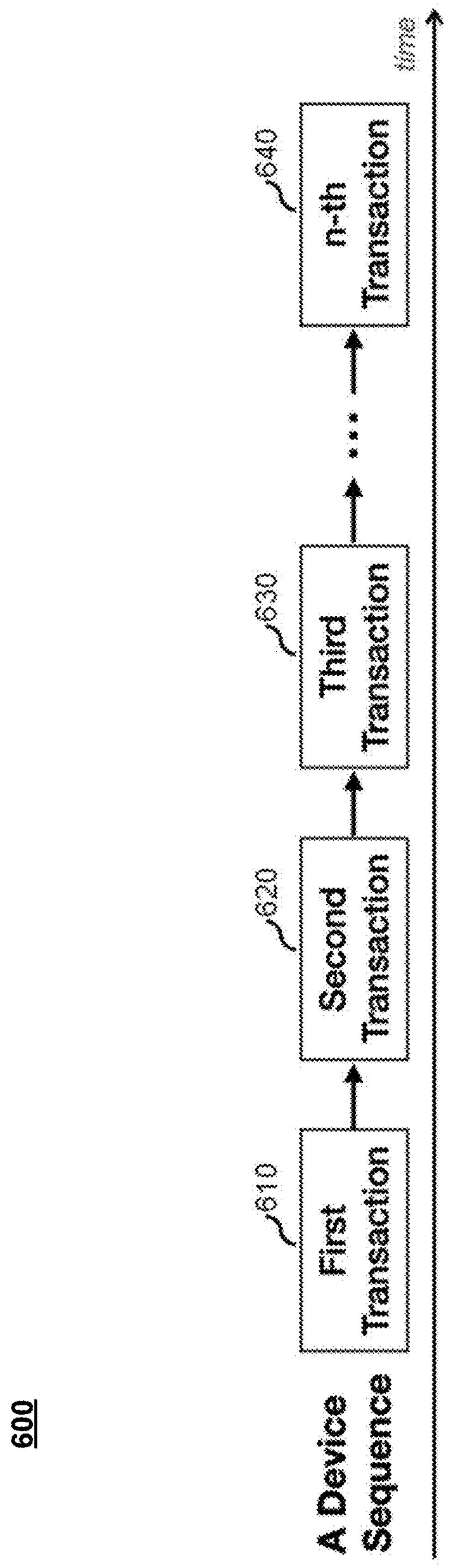
FIG. 6 illustrates a device sequence for training a fraud risk score model or computing risk score data, in accordance with some embodiments of the present teaching.

FIG. 6 illustrates a device sequence 600 for training a fraud risk score model or computing risk score data, in accordance with some embodiments of the present teaching. The device sequence 600 includes n data points or n nodes connected in a time series. In the example shown in FIG. 6, the n nodes correspond to transaction related features of the first transaction 610, the second transaction 620, the third transaction 630, . . . the n-th transaction 640, respectively, performed on a corresponding user device in the time series.

In some embodiments, the transaction related features at each of the n nodes include: time features, customer features, payment features, store features, device features and previous transaction features. The time features may include time information related to: hours since last transaction, hours of current transaction. The customer features may include customer information related to: retailer membership status (paid or trial) of a customer using the user device, associate status of the customer, time on file for the customer. The payment features may include payment information related to: payment identity, time on file for a payment method, a distance between billing address and store address. The store features may include store information related to: a store region covering a store where the current transaction is located, a fraud ranking or store risk rating of the store region compared to other store regions. The device features may include device information related to: time on file for the user device with a current retailer, time on files for the user device with other entities, unique user accounts associated with the user device, unique payment methods attached to the user device. The previous transaction features may include previous transaction information, e.g. amount and product type in a previous transaction. For example, at a current node for a current fuel transaction, the previous transaction information may include: gallons, money amount, and fuel type associated with a previous or last fuel transaction in the device sequence.

In some examples, a store risk rating is generated for a store corresponding to a sequence node as follows. First, an entire country is divided into a plurality of geographical regions. Based on a density of store distributions in different geographical regions, a clustering algorithm and/or a manual clustering is performed to compute a store risk rating for each geographical region. For example, a density-based spatial clustering of applications with noise (DBSCAN) may be performed for some geographical regions, and a manual effort is applied for other geographical regions. In some examples, a store risk rating for a given region is computed as a ratio between a first quantity of frauds in the given region and a total quantity of frauds in all regions of the country. The plurality of geographical regions can be ranked according to their respective store risk ratings. The store risk rating and/or the store risk ranking can be input as a store feature for the sequence node.

Figure 10:
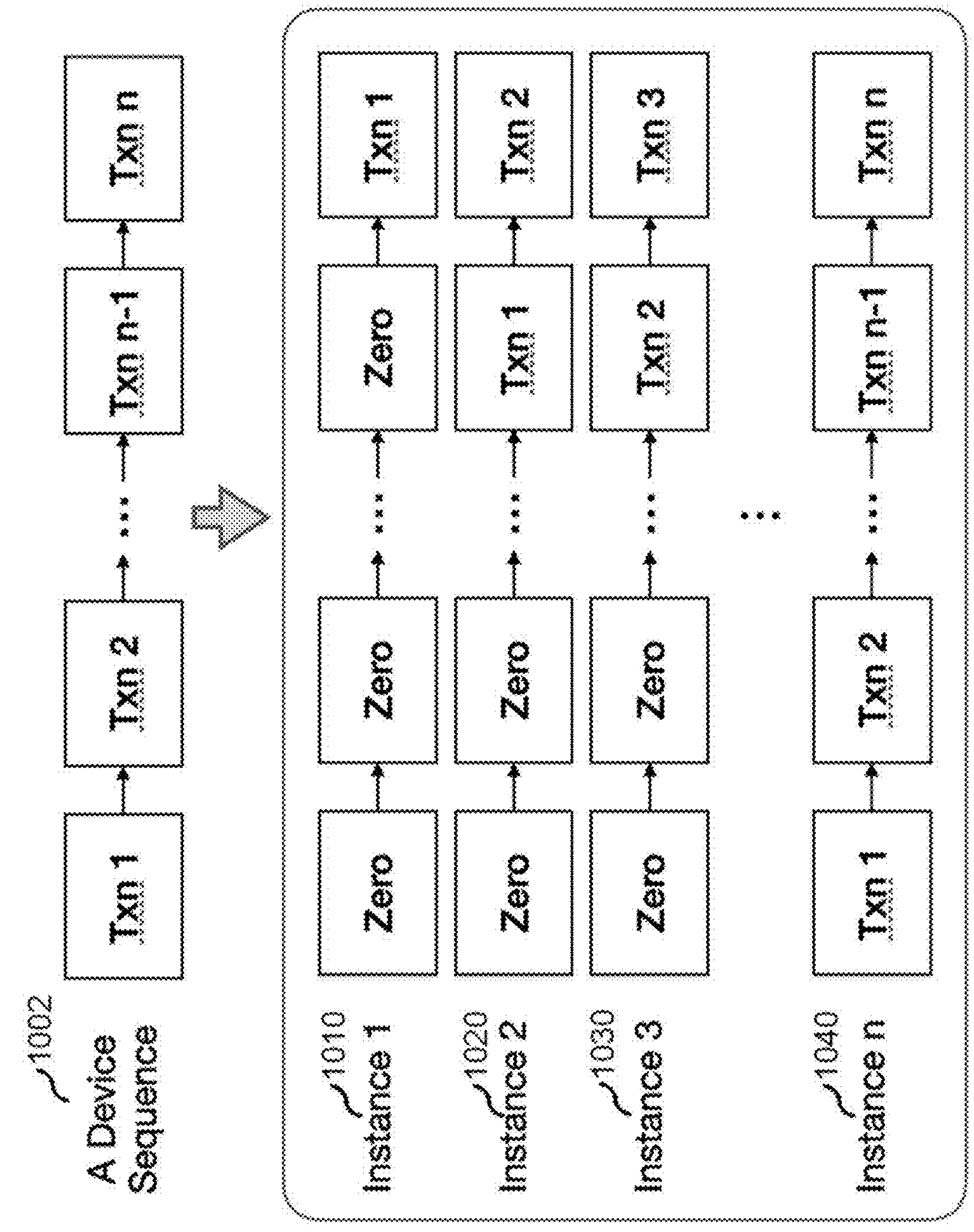
FIG. 10 illustrates a process for applying an input window on a device data sequence, in accordance with some embodiments of the present teaching.

In some embodiments, at the operation 520, an input window is applied on the device data sequence to generate a plurality of data sequences each based on a respective subset of the corresponding time series of transactions. FIG. 10 illustrates a process for applying an input window on a device data sequence, in accordance with some embodiments of the present teaching. As shown in FIG. 10, a device data sequence 1002 is formed by data points for n transactions. In the example shown in FIG. 10, the length of the input window is n, the same as the length of the original device data sequence 1002. In some embodiments, the input window is first put on a first data point in the device data sequence 1002 to generate a first data sequence 1010 having the length n. The first data sequence 1010 includes a series of (n−1) zero data points followed by the first data point corresponding to Transaction 1 of the n transactions. Then, the input window is moved one data point down the device data sequence 1002 to generate a second data sequence 1020 having the length n. The second data sequence 1020 includes a series of (n−2) zero data points followed by the first data point and a second data point in the device data sequence 1002 corresponding to Transaction 2 of the n transactions. The input window is continuously moved, so on and so forth, one data point down the device data sequence 1002 each step to generate additional data sequences 1030, 1040 each having the length n, until a last data point in the device data sequence 1002 (corresponding to Transaction n of the n transactions) is located as a last data point in the input window, as shown in the n-th data sequence 1040. In this example shown in FIG. 10, a total quantity of the plurality of data sequences is equal to n.

In general, the length of the input window is L, which can be an integer independent of the length of the device data sequence 1002. For example, the length L of the input window may be determined based on a maximum number of transactions performed by a given percentage of the plurality of user devices within the past time period.

Figure 11:
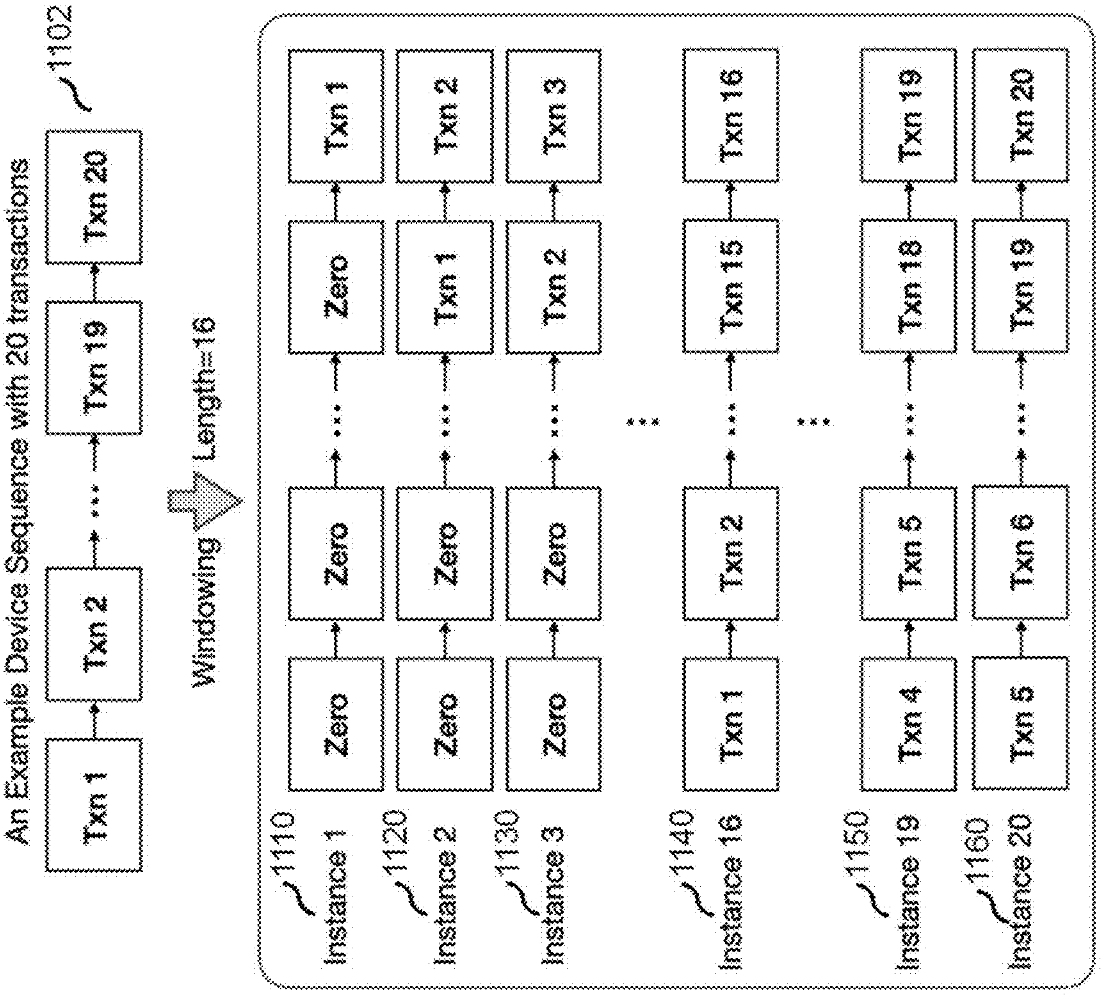
FIG. 11 illustrates a process for applying an input window on an exemplary device data sequence with 20 transactions, in accordance with some embodiments of the present teaching.

FIG. 11 illustrates a process for applying an input window on an exemplary device data sequence with 20 transactions, in accordance with some embodiments of the present teaching. In the example shown in FIG. 11, the input window has a length of 16. That is, in the example shown in FIGS. 11, n=20 and L=16.

As shown in FIG. 11, a device data sequence 1102 is formed by data points for 20 transactions. The input window with length of 16 is first put on a first data point in the device data sequence 1102 to generate a first data sequence 1110 having the length 16. The first data sequence 1110 includes a series of 15 zero data points followed by the first data point corresponding to Transaction 1 of the 20 transactions. Then, the input window is moved one data point down the device data sequence 1102 to generate a second data sequence 1120 having the length 16. The second data sequence 1120 includes a series of 14 zero data points followed by the first data point and a second data point in the device data sequence 1102 corresponding to Transaction 2 of the 20 transactions. The input window is continuously moved, so on and so forth, one data point down the device data sequence 1102 each step to generate additional data sequences 1130, 1140, 1150, 1160 each having the length 16, until a last data point in the device data sequence 1102 (corresponding to Transaction 20 of the 20 transactions) is located as a last data point in the input window, as shown in the 20-th data sequence 1160. As shown in FIG. 10, the 20-th data sequence 1160 starts from Transaction 5 and ends at Transaction 20 of the 20 transactions, having the length 16 aligning with the rolling input window.

Referring back to FIG. 5, the data preparation and transformation performed at the operation 520 may further include: generating a label for each respective user device of the plurality of user devices; and generating labelled training data based on all sequence data and labels generated for the plurality of user devices. In some embodiments, each label indicates a last transaction in the corresponding time series of transactions as: a fraudulent transaction or a non-fraudulent transaction. In some embodiments, the labels are generated for each transaction, and based on whether each transaction had a chargeback or not. The labelled training data will be used for training at least one machine learning model at operation 530.

As shown in FIG. 5, sequence based risk score model training is performed at operation 530, based on the data sequences generated at the operation 520. In some embodiments, the sequence based risk score model training includes: training a first plurality of machine learning models having an architecture of recurrent neural network (RNN) based on the labelled training data; determining optimal hyperparameters for each of the first plurality of machine learning models; training a second plurality of machine learning models having an architecture of transformer based on the labelled training data; determining optimal hyperparameters for each of the second plurality of machine learning models; and selecting, from the first plurality of machine learning models and the second plurality of machine learning models, an optimal machine learning model with optimal hyperparameters. In some embodiments, this selected optimal machine learning model will be used for computing the risk score data of the user device based on the sequence data during the inference stage of the system.

Figure 7:
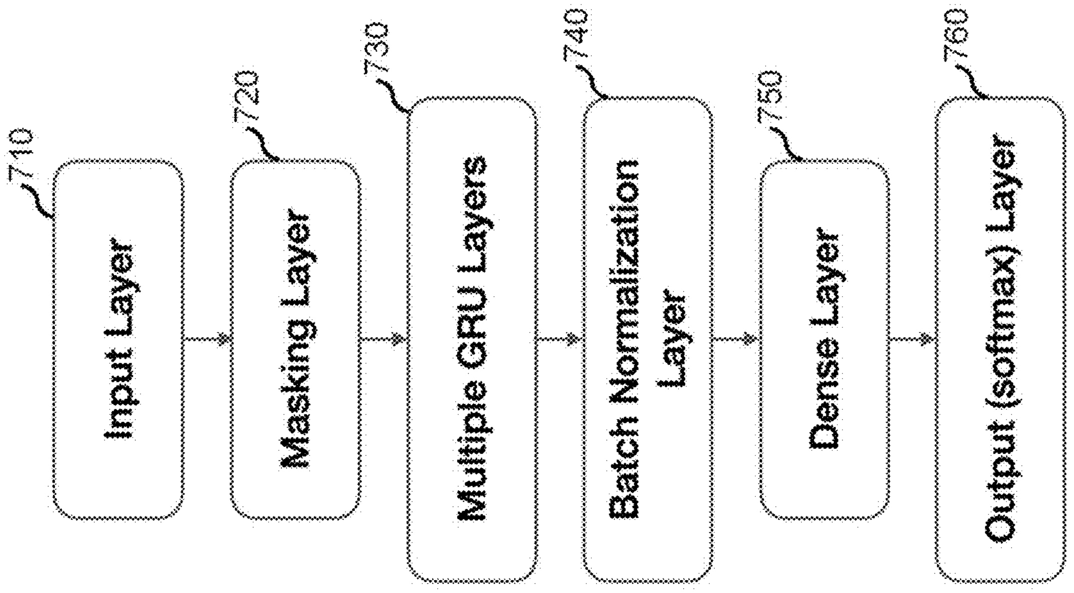
FIG. 7 illustrates an exemplary architecture of a recurrent neural network (RNN), in accordance with some embodiments of the present teaching.

FIG. 7 illustrates an exemplary architecture 700 of a recurrent neural network (RNN), in accordance with some embodiments of the present teaching. As shown in FIG. 7, the architecture 700 includes an input layer 710, a masking layer 720, multiple gated recurrent unit (GRU) layers 730, batch normalization layer 740, a dense layer 750, and an output layer 760.

In some embodiments, the input layer 710 can receive input data for training the RNN. In some examples, the input data may include the training data from the operation 520. In some examples, the input data may also include some parameters configured manually or automatically. For example, a parameter L (e.g. L=8, 10, 16, 20, 25 . . . ) can be input to indicate a maximum length of each sequence input to the RNN. That is, a data sequence longer than L will be chopped to L-length sub-sequences, and a data sequence shorter than L will be extended to a L-length sequence with zero padding. In some examples, a parameter F (e.g. F=20, 30, 45, 100 . . . ) can be input to indicate a number of features for every transaction data point in the input data sequences. In some examples, a parameter B can be input to indicate a batch size for training the RNN. In some examples, the batch size B is not specified or indicated as none.

The masking layer 720 of the RNN architecture 700 can identify zero paddings, which are used to ensure all data sequences for training have the same length L, and ignore the zero paddings for computation. A total quantity of data sequences for training will be the same as the number of transactions in the input device sequence. The GRU layers 730 of the RNN architecture 700 can learn over the data sequences with multiple layers and GRU units. Each of the GRU layers 730 may have kernel regularizers for l1 and/or l2 regularizations. The batch normalization layer 740 of the RNN architecture 700 normalizes the activations to help with vanishing or exploding gradients issue. The dense layer 750 of the RNN architecture 700 has multiple neurons and produces a representation of the data sequence in the multiple neurons.

The output layer 760 of the RNN architecture 700 may be a softmax layer which converts that multiple neurons to generate some output neurons or parameters as the output of the RNN, to indicate fraud risks. For example, the output layer 760 can output two scores: one score representing a probability of being a fraud for a particular transaction, and the other score representing a probability of not being a fraud for the particular transaction. In some examples, the particular transaction may be the last transaction in the input data sequence, which is also a new transaction to be assessed.

Figure 8A:
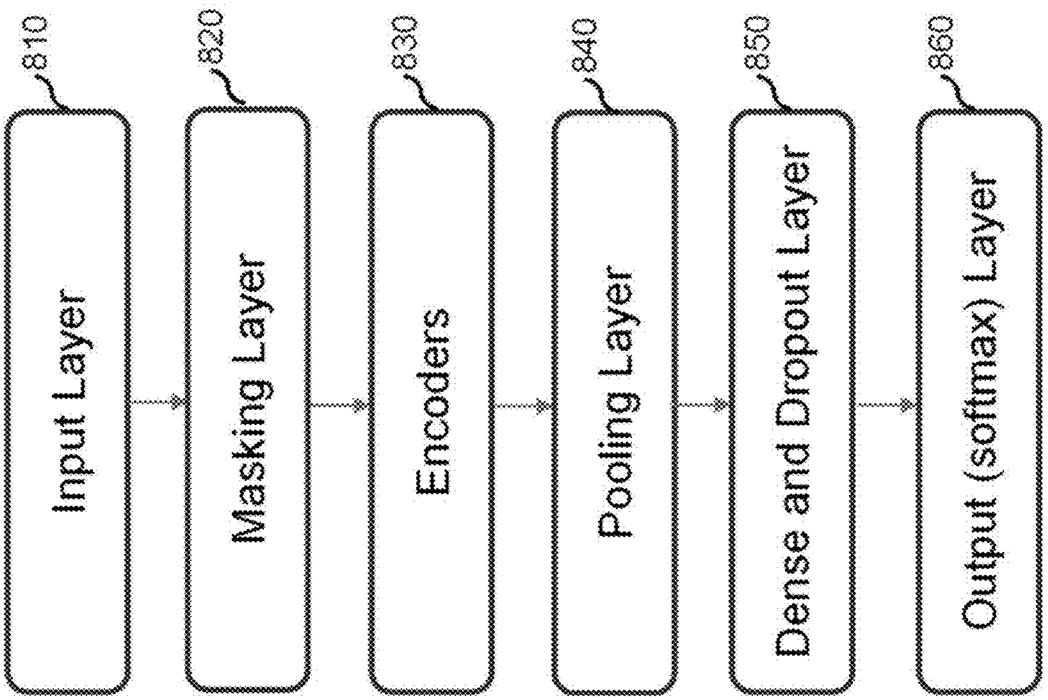
FIG. 8A illustrates an exemplary architecture of a transformer model, in accordance with some embodiments of the present teaching.

FIG. 8A illustrates an exemplary architecture 800 of a transformer model, in accordance with some embodiments of the present teaching. As shown in FIG. 8A, the architecture 800 is similar to the RNN architecture 700, except some component changes. The transformer architecture 800 includes an input layer 810, a masking layer 820, the encoders layer 830, a pooling layer 840, a dense and dropout layer 850, and an output layer 860.

Figure 8B:
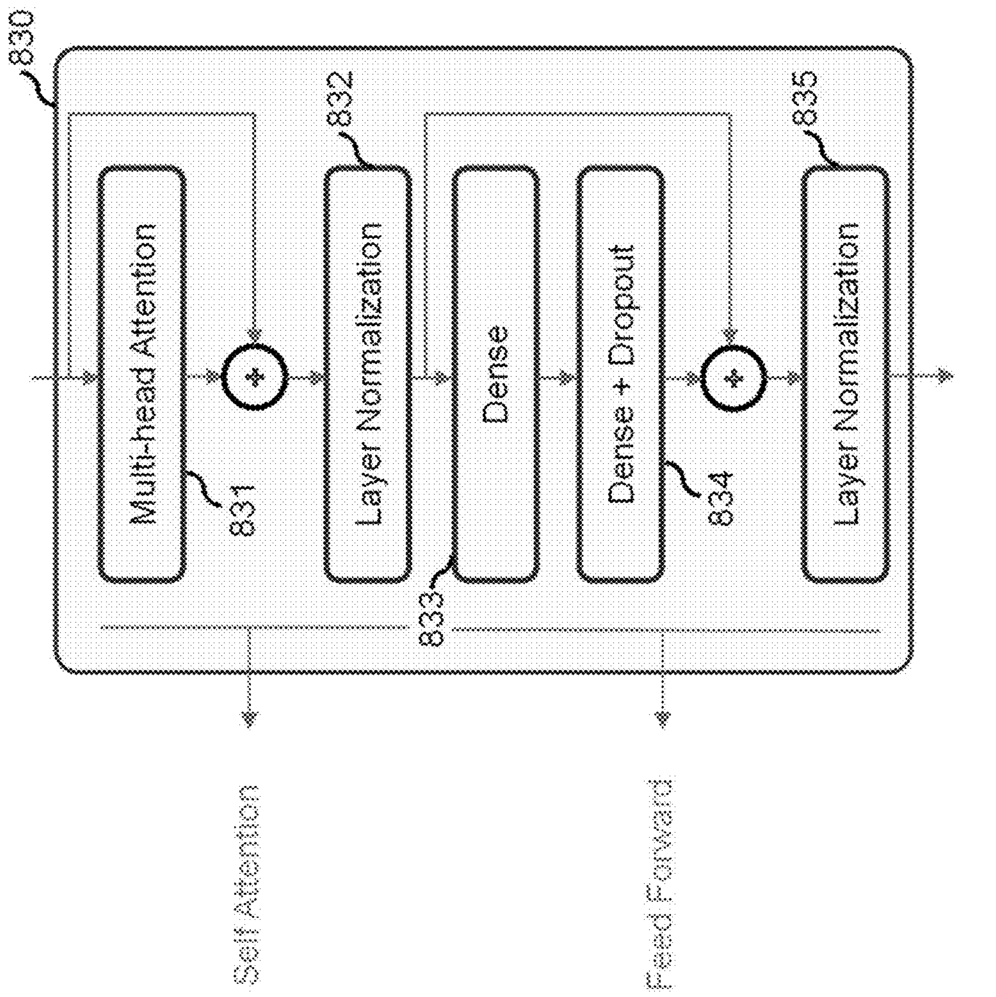
FIG. 8B illustrates an exemplary architecture of an encoder in a transformer model, in accordance with some embodiments of the present teaching.

The input layer 810 and the masking layer 820 can work similarly to the input layer 710 and the masking layer 720 in the RNN architecture 700, respectively. The component of GRU layers 730 in the RNN architecture 700 is replaced by the encoders layer 830 in the transformer architecture 800. FIG. 8B shows a detailed structure of the encoders layer 830. As shown in FIG. 8B, the encoders layer 830 includes a multi-head attention layer 831, a layer normalization 832, a dense layer 833, a dense and dropout layer 834, and another layer normalization 835. In some embodiments, the multi-head attention layer 831 and the layer normalization 832 form a self-attention function; the dense layer 833, the dense and dropout layer 834, and the other layer normalization 835 form a feed forward function. In some embodiments, the encoders layer 830 includes a plurality of connected encoders, each of which can have a structure as shown in FIG. 8B.

Referring back to FIG. 8A, the pooling layer 840 of the transformer architecture 800 can summarize the outputs of the encoders layer 830 into a fixed-size vector, e.g. reducing the data dimension based on the number of features F at the input layer 810. The dense and dropout layer 850 of the transformer architecture 800 has multiple neurons and produces a representation of the data sequence in the multiple neurons. In some examples, the number of neurons in the dense and dropout layer 850 is more than (e.g. double) the number of neurons in the dense layer 750. The dense and dropout layer 850 of the transformer architecture 800 can also perform dropout to kill a certain percentage of the neurons or disable them for a particular batch. The disabled neurons may be enabled for the next batch, and another randomly selected portion of the neurons are disabled according to the percentage for training the model again. This dropout technique can force the model not to rely on specific neurons, to make the model generalize better instead of memorizing too much using specific neurons.

Similar to the output layer 760 in the RNN architecture 700, the output layer 860 in the transformer architecture 800 converts the multiple neurons to generate some output neurons or parameters as the output of the transformer encoder, to indicate fraud risks. For example, the output layer 860 can output two scores: one score representing a probability of being a fraud for a particular transaction, and the other score representing a probability of not being a fraud for the particular transaction. In some examples, the particular transaction may be the last transaction in the input data sequence, which is also a new transaction to be assessed.

As discussed above, a first plurality of machine learning models having an architecture of RNN and a second plurality of machine learning models having an architecture of transformer (encoder part), can all be trained based on labelled training data to determine optimal hyperparameters. The hyperparameters to be optimized include but not limited to: number of layers, neurons, batch sizes, and all parameters within each layer.

In some embodiments, to select the optimal machine learning model with optimal hyperparameters from the RNN and transformer-encoder based models, some evaluation metric is utilized. In some examples, the optimal hyperparameters, for each respective machine learning model of the first plurality of machine learning models and the second plurality of machine learning models, include a threshold based on which a transaction is detected by the respective machine learning model as a fraudulent transaction or not. The optimal hyperparameters including optimal thresholds for each respective machine learning model are determined based on a maximization of an impact score, which is computed based on a difference between a sales value and a weighted chargeback value. The sales value is computed based on true negative fraud detections of the respective machine learning model. The weighted chargeback value is computed based on: (a) false negative fraud detections of the respective machine learning model and (b) weights determined based on a ratio between successful transactions and chargebacks within the past time period. The optimal machine learning model is selected based on impact scores of all of the first plurality of machine learning models and the second plurality of machine learning models with their respective optimal hyperparameters.

Figure 12:
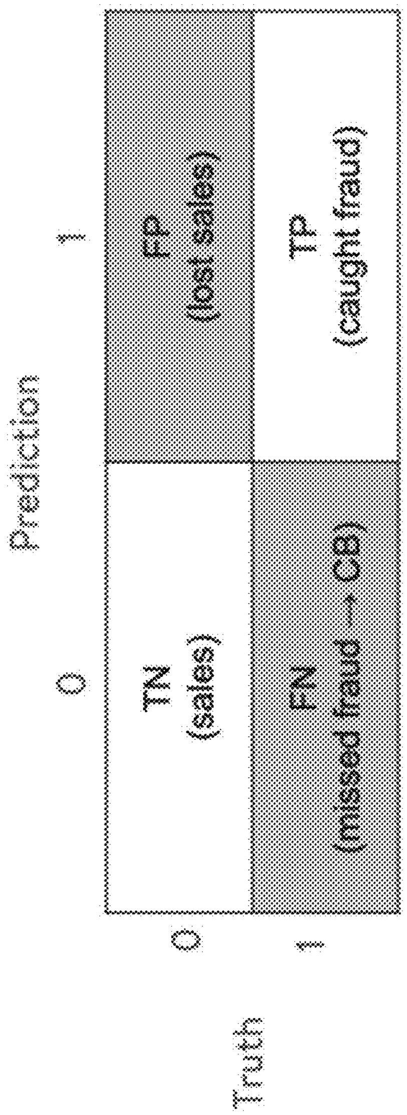
FIG. 12 illustrates a table for evaluating performance of a fraud risk score model, in accordance with some embodiments of the present teaching.

FIG. 12 illustrates a table 1200 for evaluating performance of a fraud risk score model, e.g. any of the RNN or transformer-encoder based models, in accordance with some embodiments of the present teaching. As shown in FIG. 12, for a given fraud risk score model, a comparison can be performed between the predicted result of the model and the ground truth. In this example, the predicted result of the model is 1 for predicting a particular transaction as a fraud and is 0 for predicting the particular transaction as a non-fraud. Similarly, the ground truth is 1 for labelling the particular transaction as a fraud and is 0 for labelling the particular transaction as a non-fraud.

The table 1200 shows different business impacts for different prediction-truth combinations. For example, when both the predicted result and the ground truth are 0, it is a scenario of true negative (TN), which impacts or contributes to the business as sales amount. When both the predicted result and the ground truth are 1, it is a scenario of true positive (TP), which impacts or contributes to the business as caught fraud. When the predicted result is 1 but the ground truth is 0, it is a scenario of false positive (FP), which impacts the business as lost sales. When the predicted result is 0 but the ground truth is 1, it is a scenario of false negative (FN), which impacts the business as missed fraud or chargeback (CB).

In some embodiments, an impact score may be computed for a model based on the prediction-truth combinations for all transactions used to train or test the model. Each model is trained to find optimal hyperparameters to maximize the impact score. In some examples, the impact score represents an estimate for revenue of the business, and is computed based on the following equation:

$$\text{Impact}=\text{Sales}-\text{Chargebacks}-\text{Lost Sales}=TN-FN-FP.$$

In some examples, when the transactions are related to grocery items or items with pre-fixed quantity, the model can calculate the lost sales based on the total amount in the basket. In other examples, when the transactions are related to fuels (e.g. gas, diesel, etc.) or items without pre-fixed selling amount, the model cannot calculate the lost sales because after rejecting or preventing a transaction predicted to be fraudulent, it is difficult or impossible to know how much gallons the customer would like to pump. As such, for model evaluating regarding these transactions for fuels, Impact=Sales−Chargebacks. In some cases, where it is possible to estimate the selling amount for items without pre-fixed selling amount, the model uses estimated selling amounts to calculate the lost sales. As an example, for a fuel customer who regularly purchases similar amounts of gallons every time, the lost sale is estimated using fuel prices for the average gallons that the customer consumes.

In some embodiments, not all chargebacks are the same. As such, a weighted impact score may be computed based on weighted chargebacks, to evaluate and optimize the machine learning models. Each model is trained to find optimal hyperparameters to maximize the weighted impact score. In this case, the weighted impact score represents an estimate for revenue of the business, and is computed based on the following equation:

$$\text{Weighted Impact}=\text{Sales}-\text{Weighted Chargebacks}-\text{Lost Sales}.$$

In some embodiments, the weights put on different chargebacks may be determined based on a percentage of chargebacks over all transactions within a time period and/or for a given device. In some embodiments, the weights put on different chargebacks can be treated as parameters to be optimized by the evaluation process. That is, the models are trained to learn what would be the optimized weights to maximize a weighted impact by each model.

In some embodiments, each machine learning model (RNN-based or transformer-based) has a different parameter set and is trained to compute the impact score or weighted impact score, based on a threshold. For example, if a risk score output by a machine learning model indicates that a probability of being a fraud for a particular transaction is 0.8, the risk score is compared to the threshold (e.g. 0.7), to determine that the particular transaction is a fraud, because $0.8>0.7$. That means the model predicts the fraud detection as positive, which could be a false positive (lost sales) if the label for the particular transaction is a non-fraud, or a true positive (caught fraud) if the label for the particular transaction is a fraud. As such, the impact score (or weighted impact score) can be computed for every threshold. In some examples, for each model, different thresholds are tested to find the best threshold that produces the most impact or highest impact score.

In some embodiments, after determining the best threshold and optimal hyperparameters for all machine learning models, the system can rank the models based on the impact scores (or weighted impact scores) they produce and select the optimal model (with a corresponding optimal parameter set) producing the highest impact score. The selected model and parameter set will be used during an inference stage for computing risk score data in response to risk assessment requests, as discussed above.

By putting a transaction into a device sequence, the risk score generated by a trained machine learning model as discussed above can capture any anomaly or sudden change in the trend pattern of the user device. Even without a sudden change, a transition trend, e.g. from positive to negative, may trigger an alarm that the behavior of the user device is changing, which should be checked more carefully for fraud detection in future transactions or request for account verification. In some embodiments, the trend pattern of a user device may also depend on the product type and customer type. For example, the device sequence for fuel transactions may have a very different and unpredictable pattern than non-fuel (e.g. grocery) transactions, because people tend to go to different places for shopping fuel, e.g. wherever their car is out of fuel. For example, the device sequence for transactions of a truck driver may have a very different and unpredictable pattern than their customers' transactions, because the truck driver can go from one state to another and shop for all different types of products in any store region. The above disclosed machine learning model can learn the different patterns by taking into consideration features of product types, store regions, and all other transaction related features in sequence data.

In some embodiments, different devices can be clustered into different clusters based on their risk scores and trends. A new device, even without much transaction data, can be clustered into a corresponding cluster based on their initial risk score and then learn or predict the device risk trend based on the corresponding cluster's trend. The cluster association of the device may get regularly updated as new transactions are performed by the device.

Figure 13:
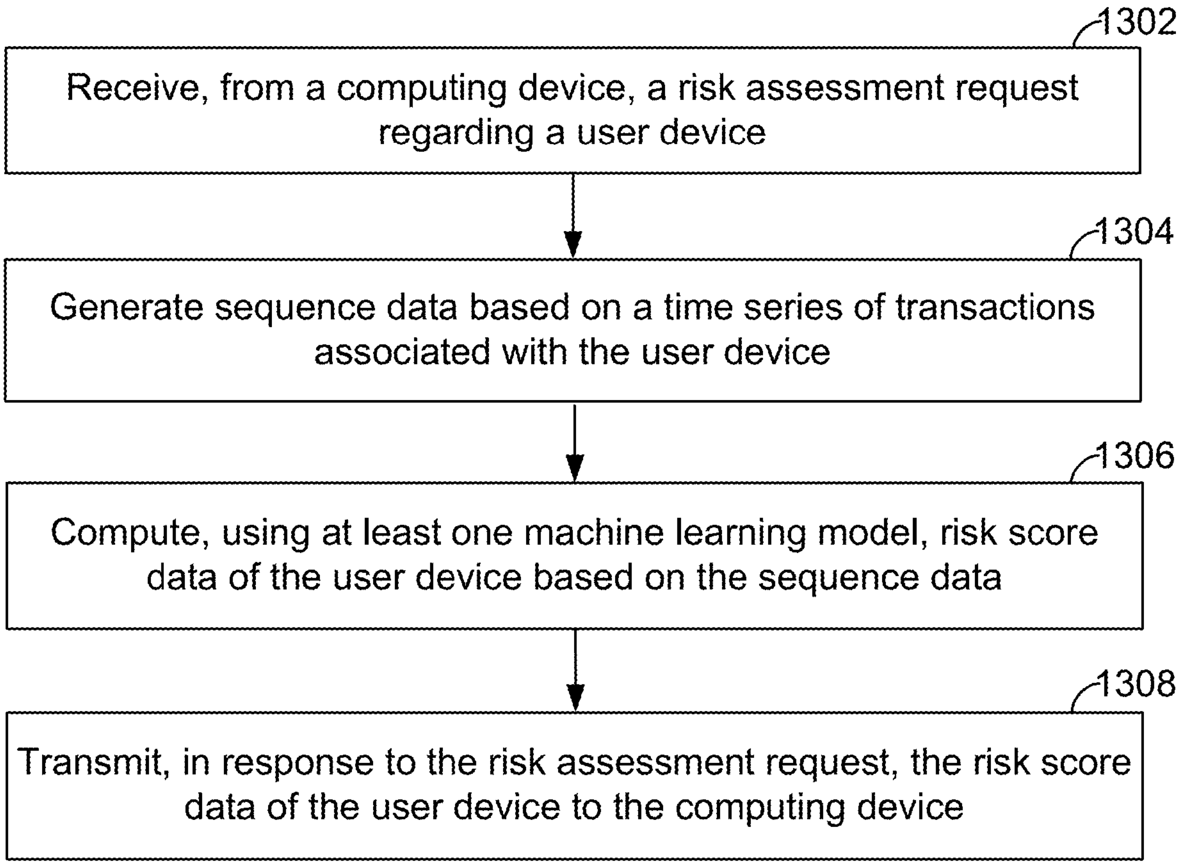
FIG. 13 is a flowchart illustrating an exemplary method for assessing fraud risk using machine learning, in accordance with some embodiments of the present teaching.

FIG. 13 is a flowchart illustrating an exemplary method 1300 for assessing fraud risk using machine learning, in accordance with some embodiments of the present teaching. In some embodiments, the method 1300 can be carried out by one or more computing devices, such as the fraud risk computing device 102 and/or the cloud-based engine 121 of FIG. 1. Beginning at operation 1302, a risk assessment request regarding a user device is received from a computing device. At operation 1304, sequence data is generated based on a time series of transactions associated with the user device. At operation 1306, risk score data of the user device is computed using at least one machine learning model based on the sequence data. At operation 1308, the risk score data of the user device is transmitted to the computing device in response to the risk assessment request.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:

a non-transitory memory having instructions stored thereon; and at least one processor operatively coupled to the non-transitory memory, wherein the instructions, when executed, cause the at least one processor to:

receive, from a database, labelled training data, wherein the labelled training data comprises a plurality of transactions, and wherein each of the plurality of transactions is labelled as fraudulent or non-fraudulent, and wherein the labelled training data is generated by:

generating training sequence data including data points for the plurality of transactions, wherein each of the data points is associated with transaction data of a respective transaction in the corresponding plurality of transactions;

applying an input window on the training sequence data to generate plurality of data sequences, wherein each of the plurality of data sequences is associated with a corresponding time sequence of the plurality of transactions; and generating the labelled training data based on the plurality of data sequences;

train a plurality of machine learning models based on the labelled training data and generate corresponding risk scores, wherein each of the plurality of machine learning models have corresponding hyperparameters comprising a threshold that each respective machine learning model uses to detect whether a transaction is fraudulent or not;

for each of the plurality of trained machine learning models:

generate a first training value characterizing true negative fraud detections based on the corresponding risk score;

generate a second training value characterizing false negative fraud detections based on the corresponding risk score; and generate an impact scores based on a comparison of the first training value and the second training value;

receive, from a computing device and over a network, a risk assessment request regarding a user device associated with a transaction;

receive, from the database, a time series of transactions associated with the user device;

generate sequence data based on the time series of transactions associated with the user device;

select at least one machine learning model from the plurality of machine learning models based on the impact scores;

compute, using the at least one machine learning model, risk score data of the user device based on the sequence data, wherein the risk score data comprises a time series of risk scores each corresponding to a respective transaction in the time series of transactions and a trend status of the user device, the trend status computed based on data points of the time series of risk scores; and transmit, in response to the risk assessment request and over the network, the risk score data of the user device to the computing device to process the transaction in accordance with the risk score data.

2. The system of claim 1, wherein each risk score in the time series of risk scores indicates a probability that the respective transaction is a fraudulent transaction.

3. The system of claim 2, wherein:

the risk score data comprises a plurality of coefficients;

the plurality of coefficients forms a polynomial curve fitting data points of the time series of risk scores; and the trend status is determined based on the polynomial curve and indicates the user device as: positive trend, negative trend, neutral trend, or transitional trend from one to another of the above three trends.

4. The system of claim 1, wherein the sequence data comprises the following information for each transaction in the time series of transactions:

time information related to: hours since last transaction, hours of current transaction;

customer information related to: retailer membership status of a customer using the user device, associate status of the customer, time on file for the customer;

payment information related to: payment identity, time on file for a payment method, a distance between billing address and store address;

store information related to: a store region covering a store where the current transaction is located, a fraud ranking of the store region compared to other store regions; and device information related to: time on file for the user device with a current retailer, time on files for the user device with other entities, unique user accounts associated with the user device, unique payment methods attached to the user device.

5. The system of claim 1, wherein the at least one machine learning model is trained based on:

obtaining transaction data related to transactions performed by a plurality of user devices within a past time period;

generating, for each respective user device of the plurality of user devices, a corresponding sequence data based on a corresponding time series of transactions associated with the respective user device;

generating, for each respective user device of the plurality of user devices, a label indicating a last transaction in the corresponding time series of transactions as: a fraudulent transaction or a non-fraudulent transaction;

generating labelled training data based on all sequence data and labels generated for the plurality of user devices; and training the at least one machine learning model based on the labelled training data.

6. The system of claim 5, wherein generating the corresponding sequence data comprises:

selecting data from the transaction data based on stratification to generate selected data;

processing the selected data based on encoding and imputation to generate processed data;

generating a device data sequence including N data points for all of the corresponding time series of transactions, wherein each data point is associated with transaction data of a respective transaction in the corresponding time series of transactions, wherein N is an integer;

applying an input window on the device data sequence to generate a plurality of data sequences each based on a respective subset of the corresponding time series of transactions; and generating the corresponding sequence data based on the plurality of data sequences.

7. The system of claim 6, wherein applying the input window comprises:

putting the input window on a first data point in the device data sequence to generate a first data sequence having a predetermined length L, wherein L is an integer, and the first data sequence includes a series of (L−1) zero data points followed by the first data point;

moving the input window one data point down the device data sequence to generate a second data sequence having the predetermined length L, wherein the second data sequence includes a series of (L−2) zero data points followed by the first data point and a second data point in the device data sequence; and continuously moving the input window one data point down the device data sequence to generate additional data sequences each having the predetermined length L, until a last data point in the device data sequence is located as a last data point in the input window.

8. The system of claim 7, wherein:

a total quantity of the plurality of data sequences is equal to N; and

L is determined based on a maximum number of transactions performed by a given percentage of the plurality of user devices within the past time period.

9. The system of claim 5, wherein training the at least one machine learning model comprises:

training a first plurality of machine learning models having an architecture of recurrent neural network (RNN) based on the labelled training data;

determining optimal hyperparameters for each of the first plurality of machine learning models;

training a second plurality of machine learning models having an architecture of transformer based on the labelled training data;

determining optimal hyperparameters for each of the second plurality of machine learning models; and selecting, from the first plurality of machine learning models and the second plurality of machine learning models, an optimal machine learning model with optimal hyperparameters for computing the risk score data of the user device based on the sequence data.

10. The system of claim 9, wherein:

the optimal hyperparameters, for each respective machine learning model of the first plurality of machine learning models and the second plurality of machine learning models, include a threshold based on which a transaction is detected by the respective machine learning model as a fraudulent transaction or not;

the optimal hyperparameters including optimal thresholds for each respective machine learning model are determined based on a maximization of an impact score, which is computed based on a difference between a sales value and a weighted chargeback value;

the sales value is computed based on true negative fraud detections of the respective machine learning model;

the weighted chargeback value is computed based on: (a) false negative fraud detections of the respective machine learning model and (b) weights determined based on a ratio between successful transactions and chargebacks within the past time period; and the optimal machine learning model is selected based on impact scores of all of the first plurality of machine learning models and the second plurality of machine learning models with their respective optimal hyperparameters.

11. A computer-implemented method, comprising:

receiving, from a database, labelled training data, wherein the labelled training data comprises a plurality of transactions, wherein each of the plurality of transactions is labelled as fraudulent or non-fraudulent, and wherein the labelled training data is generated by:

generating training sequence data including data points for the plurality of transactions, wherein each of the data points is associated with transaction data of a respective transaction in the corresponding plurality of transactions;

applying an input window on the training sequence data to generate plurality of data sequences, wherein each of the plurality of data sequences is associated with a corresponding time sequence of the plurality of transactions; and generating the labelled training data based on the plurality of data sequences;

training a plurality of machine learning models based on the labelled training data and generate corresponding risk scores, wherein each of the plurality of machine learning models have corresponding hyperparameters comprising a threshold that each respective machine learning model uses to detect whether a transaction is fraudulent or not;

for each of the plurality of trained machine learning models:

generating a first training value characterizing true negative fraud detections based on the corresponding risk score;

generating a second training value characterizing false negative fraud detections based on the corresponding risk score; and generating an impact scores based on a comparison of the first training value and the second training value;

receiving, from a computing device and over a network, a risk assessment request regarding a user device associated with a transaction;

receiving, from the database, a time series of transactions associated with the user device;

generating sequence data based on the time series of transactions associated with the user device;

selecting at least one machine learning model from the plurality of machine learning models based on the impact scores;

computing, using the at least one machine learning model, risk score data of the user device based on the sequence data, wherein the risk score data comprises a time series of risk scores each corresponding to a respective transaction in the time series of transactions and a trend status of the user device, the trend status computed based on data points of the time series of risk scores; and transmitting, in response to the risk assessment request and over the network, the risk score data of the user device to the computing device to process the transaction in accordance with the risk score data.

12. The computer-implemented method of claim 11, wherein each risk score in the time series of risk scores indicates a probability that the respective transaction is a fraudulent transaction.

13. The computer-implemented method of claim 12, wherein:

the risk score data comprises a plurality of coefficients;

the plurality of coefficients forms a polynomial curve fitting data points of the time series of risk scores; and the trend status is determined based on the polynomial curve and indicates the user device as: positive trend, negative trend, neutral trend, or transitional trend from one to another of the above three trends.

14. The computer-implemented method of claim 11, wherein the sequence data comprises the following information for each transaction in the time series of transactions:

time information related to: hours since last transaction, hours of current transaction;

customer information related to: retailer membership status of a customer using the user device, associate status of the customer, time on file for the customer;

payment information related to: payment identity, time on file for a payment method, a distance between billing address and store address;

store information related to: a store region covering a store where the current transaction is located, a fraud ranking of the store region compared to other store regions; and device information related to: time on file for the user device with a current retailer, time on files for the user device with other entities, unique user accounts associated with the user device, unique payment methods attached to the user device.

15. The computer-implemented method of claim 11, wherein the at least one machine learning model is trained based on:

obtaining transaction data related to transactions performed by a plurality of user devices within a past time period;

generating, for each respective user device of the plurality of user devices, a corresponding sequence data based on a corresponding time series of transactions associated with the respective user device;

generating, for each respective user device of the plurality of user devices, a label indicating a last transaction in the corresponding time series of transactions as: a fraudulent transaction or a non-fraudulent transaction;

generating labelled training data based on all sequence data and labels generated for the plurality of user devices; and training the at least one machine learning model based on the labelled training data.

16. The computer-implemented method of claim 15, wherein generating the corresponding sequence data comprises:

selecting data from the transaction data based on stratification to generate selected data;

processing the selected data based on encoding and imputation to generate processed data;

generating a device data sequence including N data points for all of the corresponding time series of transactions, wherein each data point is associated with transaction data of a respective transaction in the corresponding time series of transactions, wherein N is an integer;

applying an input window on the device data sequence to generate a plurality of data sequences each based on a respective subset of the corresponding time series of transactions; and generating the corresponding sequence data based on the plurality of data sequences.

17. The computer-implemented method of claim 16, wherein applying the input window comprises:

putting the input window on a first data point in the device data sequence to generate a first data sequence having a predetermined length L, wherein the first data sequence includes a series of (L−1) zero data points followed by the first data point;

moving the input window one data point down the device data sequence to generate a second data sequence having the predetermined length L, wherein the second data sequence includes a series of (L−2) zero data points followed by the first data point and a second data point in the device data sequence; and continuously moving the input window one data point down the device data sequence to generate additional data sequences each having the predetermined length L, until a last data point in the device data sequence is located as a last data point in the input window, wherein:

a total quantity of the plurality of data sequences is equal to N, and

L is an integer determined based on a maximum number of transactions performed by a given percentage of the plurality of user devices within the past time period.

18. The computer-implemented method of claim 15, wherein training the at least one machine learning model comprises:

training a first plurality of machine learning models having an architecture of recurrent neural network (RNN) based on the labelled training data;

determining optimal hyperparameters for each of the first plurality of machine learning models;

training a second plurality of machine learning models having an architecture of transformer based on the labelled training data;

determining optimal hyperparameters for each of the second plurality of machine learning models; and selecting, from the first plurality of machine learning models and the second plurality of machine learning models, an optimal machine learning model with optimal hyperparameters for computing the risk score data of the user device based on the sequence data.

19. The computer-implemented method of claim 18, wherein:

the optimal hyperparameters, for each respective machine learning model of the first plurality of machine learning models and the second plurality of machine learning models, include a threshold based on which a transaction is detected by the respective machine learning model as a fraudulent transaction or not;

the optimal hyperparameters including optimal thresholds for each respective machine learning model are determined based on a maximization of an impact score, which is computed based on a difference between a sales value and a weighted chargeback value;

the sales value is computed based on true negative fraud detections of the respective machine learning model;

the weighted chargeback value is computed based on: (a) false negative fraud detections of the respective machine learning model and (b) weights determined based on a ratio between successful transactions and chargebacks within the past time period; and the optimal machine learning model is selected based on impact scores of all of the first plurality of machine learning models and the second plurality of machine learning models with their respective optimal hyperparameters.

20. A non-transitory computer readable medium having instructions stored thereon, wherein the instructions, when executed by at least one processor, cause at least one device to perform operations comprising:

receiving, from a database, labelled training data, wherein the labelled training data comprises a plurality of transactions, wherein each of the plurality of transactions is labelled as fraudulent or non-fraudulent, and wherein the labelled training data is generated by:

generating training sequence data including data points for the plurality of transactions, wherein each of the data points is associated with transaction data of a respective transaction in the corresponding plurality of transactions;

applying an input window on the training sequence data to generate a plurality of data sequences, wherein each of the plurality of data sequences is associated with a corresponding time sequence of the plurality of transactions; and generating the labelled training data based on the plurality of data sequences;

training a plurality of machine learning models based on the labelled training data and generate corresponding risk scores, wherein each of the plurality of machine learning models have corresponding hyperparameters comprising a threshold that each respective machine learning model uses to detect whether a transaction is fraudulent or not;

for each of the plurality of trained machine learning models:

generating a first training value characterizing true negative fraud detections based on the corresponding risk score;

generating a second training value characterizing false negative fraud detections based on the corresponding risk score; and generating an impact scores based on a comparison of the first training value and the second training value;

receiving, from a computing device and over a network, a risk assessment request regarding a user device associated with a transaction;

receiving, from the database, a time series of transactions associated with the user device;

generating sequence data based on the time series of transactions associated with the user device;

selecting at least one machine learning model from the plurality of machine learning models based on the impact scores;

computing, using the at least one machine learning model, risk score data of the user device based on the sequence data, wherein the risk score data comprises a time series of risk scores each corresponding to a respective transaction in the time series of transactions and a trend status of the user device, the trend status computed based on data points of the time series of risk scores; and transmitting, in response to the risk assessment request and over the network, the risk score data of the user device to the computing device to process the transaction in accordance with the risk score data.

* * * * *